United States Patent
Phelps et al.

(10) Patent No.: US 8,667,236 B2
(45) Date of Patent: Mar. 4, 2014

(54) HOST BASED WRITE ORDERING FOR ASYNCHRONOUS REPLICATION

(75) Inventors: Adam M. Phelps, San Francisco, CA (US); Richard T. Dalzell, Belfast (GB); Hariprasad Mankude Bhasker Rao, San Ramon, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 772 days.

(21) Appl. No.: 12/893,335

(22) Filed: Sep. 29, 2010

(65) Prior Publication Data

US 2012/0079222 A1    Mar. 29, 2012

(51) Int. Cl.
  *G06F 12/00*   (2006.01)
  *G06F 13/00*   (2006.01)
  *G06F 13/28*   (2006.01)

(52) U.S. Cl.
  USPC ........................................................ 711/162

(58) Field of Classification Search
  USPC ........................................................ 711/162
  See application file for complete search history.

(56) References Cited

U.S. PATENT DOCUMENTS

| | | | |
|---|---|---|---|
| 7,188,125 B1 * | 3/2007 | Karr ...................................... 1/1 |
| 7,647,449 B1 * | 1/2010 | Roy et al. ...................... 711/112 |
| 2002/0116587 A1 | 8/2002 | Modelski et al. |
| 2004/0267836 A1 | 12/2004 | Armangau et al. |
| 2005/0071584 A1 * | 3/2005 | Griffin et al. ................. 711/162 |
| 2007/0050603 A1 | 3/2007 | Vorbach et al. |
| 2008/0162811 A1 | 7/2008 | Steinmetz et al. |
| 2010/0306488 A1 * | 12/2010 | Stroberger .................... 711/162 |

OTHER PUBLICATIONS

ISR/WO, PCT/US2011/053723, HP reference 828548427, May 1, 2012, 13 pps.

* cited by examiner

*Primary Examiner* — Matthew Bradley
*Assistant Examiner* — Craig Goldschmidt

(57) ABSTRACT

A host write based write ordering mechanism is used so the write ordering on the secondary system is derived from the write ordering applied by the host to the primary system. In this scheme any set of writes that was issued in parallel on the primary system may also be issued in parallel on the secondary system. The parallel writes provide better performance compared to absolute or strict write ordering allowing only one outstanding write per volume group.

17 Claims, 8 Drawing Sheets

(Background)

US 8,667,236 B2

HOST BASED WRITE ORDERING FOR ASYNCHRONOUS REPLICATION

FIELD OF INVENTION

This invention relates to a method for asynchronously replicating data from a primary data storage system to a secondary data storage system.

DESCRIPTION OF RELATED ART

FIG. 1 illustrates a system 100 for mirroring data in a primary volume on a primary data storage system 102 (hereafter "primary system 102") to a secondary volume on a secondary data storage system 104 (hereafter "secondary system 104"). In step 1, a host computer 106 sends writes to primary system 102 and then waits for their acknowledgments. In step 2, primary system 102 caches or otherwise stores the writes and then acknowledges them to host computer 106. Periodically primary system 102 flushes the writes to disk. To maintain coherency, each write to disk from cache may be performed in the same "write order" as that issued by host computers. Steps 1 and 2 repeat as host computer 106 sends additional writes to primary system 102.

In step 3, primary system 102 mirrors the writes to secondary system 104. This allows for disaster recovery from the secondary volume in secondary system 104 in case the primary volume in primary system 102 becomes unavailable. In step 4, secondary system 104 caches or otherwise stores the writes and then acknowledges them to primary system 102. Steps 3 and 4 repeat as primary system 102 periodically mirrors the writes to secondary system 104. This technique is known as the asynchronous periodic mode of remote copy.

SUMMARY

In one or more embodiment of the present disclosure, a method is provided for asynchronously replicating data from a primary system to a secondary system. The primary system receives a sequence of host writes from a host computer. For each host write, the primary system issues a ticket to the host write. The ticket includes a ticket number, which is incremented after each ticket is issued. The ticket number indicates the sequential position of the host write in the sequence. The ticket also includes a highest completed ticket number, which is set to the highest ticket number of completed host writes in the primary system at the time the ticket is issued. The highest completed ticket number indicates the sequential dependency of the host write on another host write in the sequence. The primary system stores the ticket in a ticket log and the write data in a data log. The primary system sends an acknowledgement to the host system for each completed host write. The primary system sends the ticket log and the data log as write requests to the secondary system for asynchronous replication.

The secondary system processes each write request. If the highest completed ticket number of a write request is equal to or less than the highest ticket number of completed write requests at the secondary system that are contiguous from the start of the sequence, then the write request is issued on the secondary system. The contiguity from the start of the sequence protects against out of order write completions on the secondary system. The above configuration allows multiple write requests to be issued in parallel on the secondary system.

BRIEF DESCRIPTION OF THE DRAWINGS

In the drawings.

Use of the same reference numbers in different figures indicates similar or identical elements.

DETAILED DESCRIPTION

Figure 1:
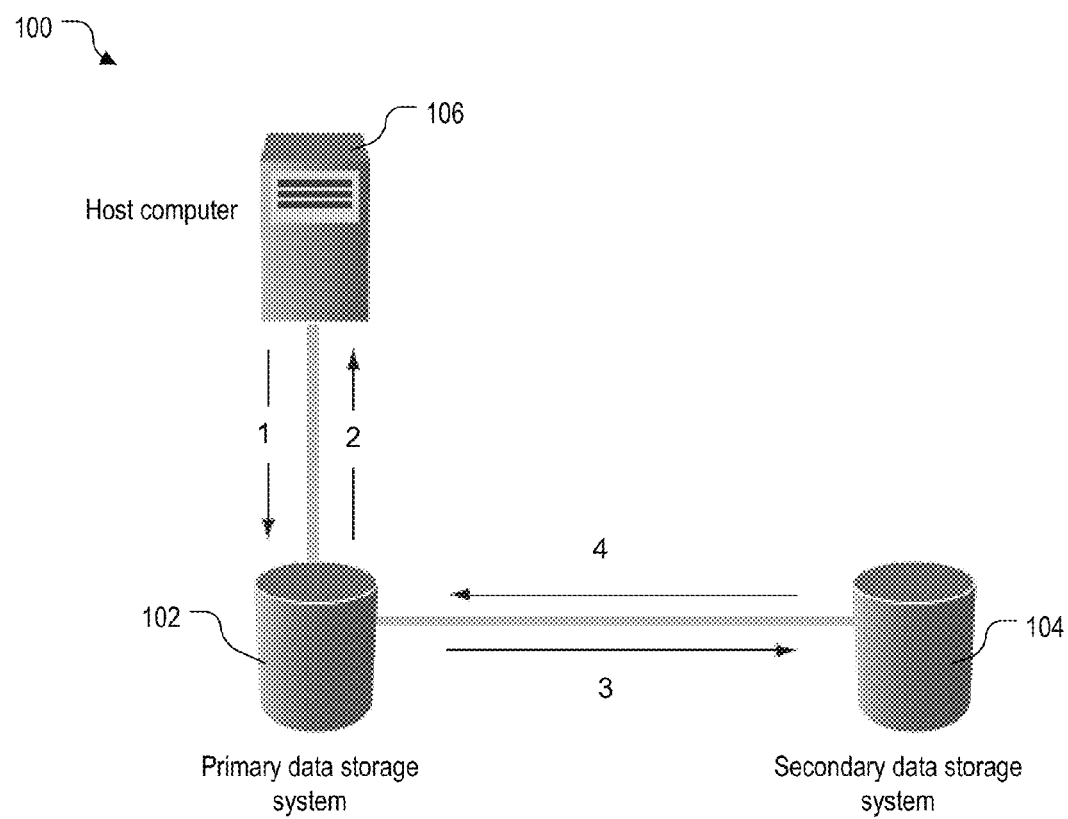
FIG. 1 is a block diagram of a system implementing asynchronous replication of data from a primary system to a secondary system.

A volume group consists of one or more volumes. It is important to preserve the order of writes to a primary volume group on a primary system and then issue these writes in the same order on a secondary volume group on a secondary system. Unless write ordering is maintained between the primary and the secondary volume groups, recovery from the secondary cannot be guaranteed as the data may be incoherent. Absolute or strict write ordering requires complete serialization and there should be only one write outstanding from the primary to the secondary system on a group by group basis. This is very impractical or inefficient from a performance standpoint.

In one or more embodiments of the present disclosure, a host write based write ordering mechanism is used so that write ordering for a secondary volume group on the secondary system is derived from the write ordering applied by the host to a primary volume group on the primary system. In this scheme any set of host writes that was issued in parallel on the primary system may also be issued in parallel on the secondary system. This improves performance as more writes can be issued on the secondary at the same time.

This write ordering is coordinated with tickets issued by a first ticketing process on the primary system. The first ticketing process issues a ticket number for each host write. The ticket number indicates the sequential position of the host write in a sequence of host writes to the primary system. Every time a host write completes, the first ticketing process is informed so it is aware of the highest ticket number of completed host writes at the primary system ("highest completed ticket number"). The first ticketing process also issues a highest completed ticket number for each host write, which is the highest completed ticket number at the time a ticket is issued. The highest completed ticket number indicates the sequential dependency of the host write on another host write in the sequence. Both the ticket number and the highest completed ticket number of the host write are sent to the secondary system.

When the write requests are received at the secondary system, a second ticketing process on the secondary system is contacted for permission to proceed. The second ticketing process tracks which ticket numbers have been seen and it is also aware of the highest ticket number from completed writes at the secondary system that are contiguous from the start of the sequence ("highest completed contiguous ticket number"). The second ticketing process only gives permission to write requests having highest completed ticket numbers equal to or less than the highest completed contiguous ticket number. These write requests may then be issued in parallel. Note the highest completed contiguous ticket number is used instead of the highest completed ticket number to protect against out of order write completions on the secondary system.

The following example is used to demonstrate the host write based write ordering mechanism in one or more embodiments of the present disclosure. Table 1 shows the ticket number issued to the host writes as they arrive and the dependencies between write completion and new host write arrival. In Table 1, the row numbers represent the ticket numbers, the column numbers represent arbitrary units of time, "s" is the start of a host write, "x" is the host write in progress, and "e" is the end of the host write. For example, host write #3 started when host write #1 and #2 were in progress and completed before host write #8 started.

TABLE 1

Exemplary host writes

|   | 1 | 2 | 3 | 4 | 5 | 6 | 7 | 8 | 9 | 10 | 11 | 12 | 13 | 14 | 15 |
|---|---|---|---|---|---|---|---|---|---|----|----|----|----|----|----|
| 1 | s | x | x | e |   |   |   |   |   |    |    |    |    |    |    |
| 2 |   | s | x | x | e |   |   |   |   |    |    |    |    |    |    |
| 3 |   |   | s | x | x | x | x | e |   |    |    |    |    |    |    |
| 4 |   |   |   | s | x | x | e |   |   |    |    |    |    |    |    |
| 5 |   |   |   |   | s | x | e |   |   |    |    |    |    |    |    |
| 6 |   |   |   |   |   | s | x | x | x | x  | e  |    |    |    |    |
| 7 |   |   |   |   |   |   | s | x | x | x  | e  |    |    |    |    |
| 8 |   |   |   |   |   |   |   | s | x | e  |    |    |    |    |    |
| 9 |   |   |   |   |   |   |   |   | s | x  | x  | e  |    |    |    |
| 10 |   |   |   |   |   |   |   |   |   | s | x  | x  | e  |    |    |
| 11 |   |   |   |   |   |   |   |   |   |    | s  | x  | x  | e  |    |
| 12 |   |   |   |   |   |   |   |   |   |    |    | s  | e  |    |    |
| 13 |   |   |   |   |   |   |   |   |   |    |    |    | s  | x  | x  |
| 14 |   |   |   |   |   |   |   |   |   |    |    |    |    | s  | x  |
| 15 |   |   |   |   |   |   |   |   |   |    |    |    |    |    | s  |

TABLE 2

Dependency chart for the host writes in Table 1

| Ticket number | Dependency (highest completed ticket number) |
|---|---|
| 1 | 0 |
| 2 | 0 |
| 3 | 0 |
| 4 | 1 |
| 5 | 2 |
| 6 | 2 |
| 7 | 5 |
| 8 | 5 |
| 9 | 5 |
| 10 | 8 |
| 11 | 8 |
| 12 | 9 |

TABLE 2-continued

Dependency chart for the host writes in Table 1

| Ticket number | Dependency (highest completed ticket number) |
|---|---|
| 13 | 12 |
| 14 | 12 |
| 15 | 12 |

From the dependency chart, it can be seen that the host computer sent host write #4 after the completion of host write #1. Therefore host write #4 cannot be issued on the secondary system until host write #1 completes on the secondary system. Along with address and write data, this dependency information is sent to the secondary system for host write #4 as a ticket number of #4 and a highest completed ticket number of #1.

To preserve the ordering, the highest completed ticket number can only increase and not decrease. It can be seen that host write #7 has a highest completed ticket number of #5 because host write #5 completed when host write #7 started while host write #3 is still in progress. Subsequently host write #8 also has a highest completed ticket number of #5 even though host write #3 completed when host write #8 started. The primary system basically records only the highest completed ticket number.

The secondary system receives a stream of write requests from the primary system and checks the ticket numbers and the highest completed ticket numbers for the write requests. As can be seen, write requests #1, #2, #3 are the very first write requests so their highest completed ticket numbers may be set to 0 and the highest completed contiguous ticket number may be initialized to 0 (i.e., the start of the sequence). This allows write requests #1, #2, and #3 to proceed in parallel as their highest completed ticket numbers are equal to or less than the highest completed contiguous ticket number.

Write request #4 has a highest completed ticket number of #1 so it may proceed once the highest completed contiguous ticket number becomes #1 or more. Assume write requests #2 and #3 finish before write request #1. As their ticket numbers of #2 and #3 are not contiguous from the start of the sequence (i.e., they are not contiguous with the current value of the highest completed contiguous ticket number of #0), their ticket numbers #2 and #3 are saved in a list. Once write request #1 finishes, its ticket number #1 is set as the new value of the highest completed contiguous ticket number because ticket number #1 is contiguous from the start of the sequence (i.e., it is contiguous with the current value of the highest completed contiguous ticket number of #0). Once the highest completed contiguous ticket number becomes #1, write request #4 is allowed to proceed.

As ticket numbers of #2 and #3 in the list are now contiguous from the start of the sequence (i.e., they are contiguous with the highest completed contiguous ticket number of #1), the highest completed contiguous ticket number is set equal to the highest ticket number of #3 from the ticket numbers of #2 and #3. Write requests #5 and #6 are now allowed to proceed because their highest completed ticket number of #2 is equal to or less than the highest completed contiguous ticket number of #3. As can be seen, the secondary system determines whether write requests can proceed based on the highest completed ticket number of the write requests and the highest completed contiguous ticket number at the secondary system.

Figure 2:
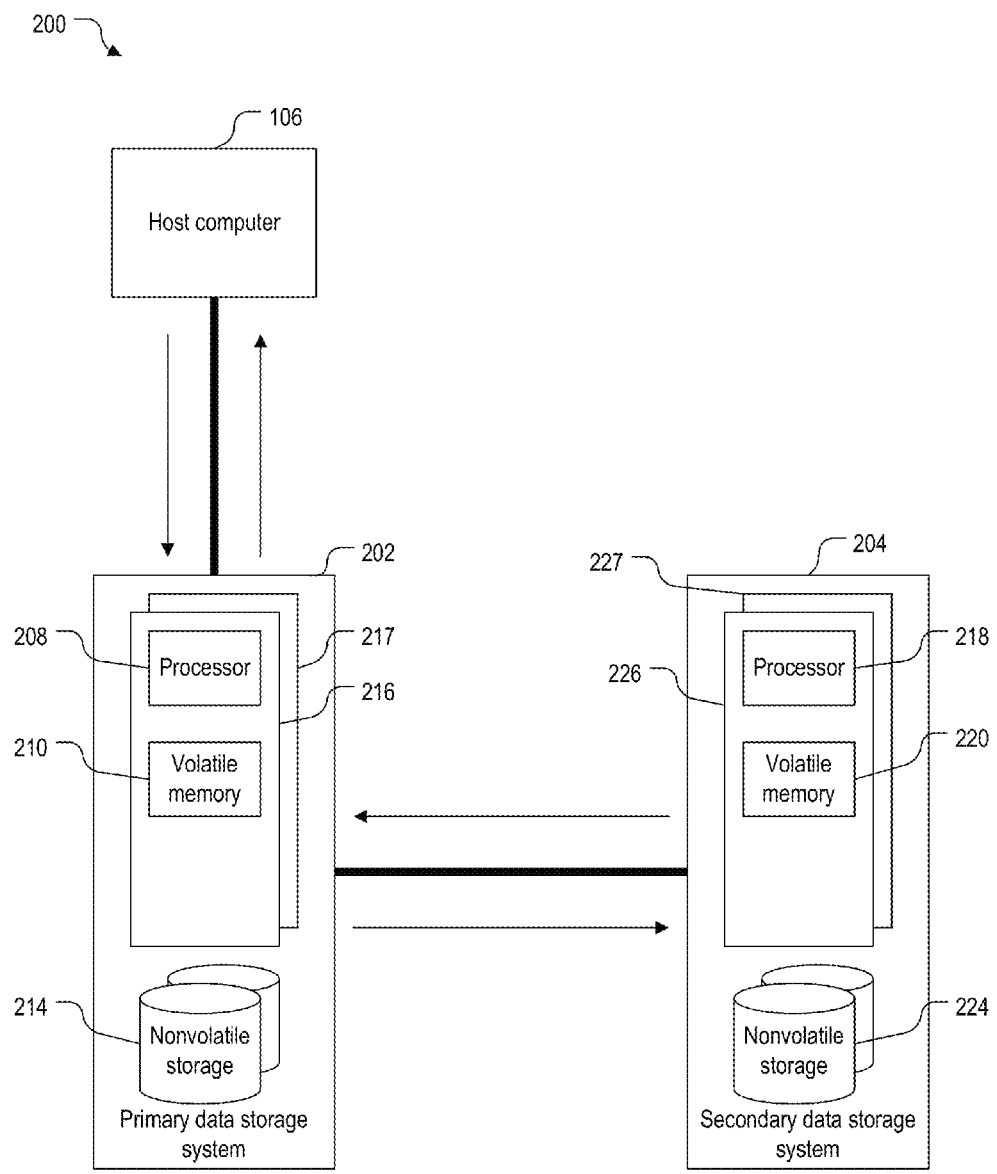
FIG. 2 is a block diagram of a system implementing asynchronous replication of data from a primary system to a secondary system in one or more embodiments of the present disclosure.

FIG. 2 is a block diagram of a system 200 implementing asynchronous replication of data from a primary system to a secondary system in one or more embodiments of the present disclosure. System 200 asynchronously replicates data in one or more primary volume groups on a primary system 202 to one or more corresponding secondary volume groups on a secondary system 204 in one or more embodiments of the present disclosure.

Primary system 202 includes a processor 208 controlling the overall function of primary system 202, a volatile memory 210 storing asynchronous replication processes (which may be loaded from a nonvolatile memory) and caching host writes from host computer 106, and nonvolatile storage 214 making up the primary volume group. Nonvolatile storage 214 may be hard disk drives, flash drives, optical disk drives, magnetic tape drives, or holographic drives.

Processor 208 and volatile memory 210 may form a controller node 216 in a cluster of interconnected controller nodes of the same construction. For the sake of clarity, only one additional controller node 217 is illustrated. Clustering of controller nodes provides redundancy, high bandwidth, and scalability to primary system 202. In one example, primary system 202 is an InServ® Storage Server available from 3PARdata, Inc. of Fremont, Calif.

Secondary system 204 is similar to primary system 202. Secondary system 204 includes a processor 218 controlling the overall function of primary system 202, a volatile memory 220 storing asynchronous replication processes and caching host writes from primary system 202, and nonvolatile storage 224 making up the secondary volume group.

In one embodiment, processor 218 and volatile memory 220 form a controller node 226 in a cluster of interconnected controller nodes of the same construction in secondary system 204. For the sake of clarity, only one additional controller node 227 is illustrated. In one example, secondary system 204 is also an InServ® Storage Server available from 3PARdata, Inc. of Fremont, Calif.

In one embodiment, the secondary volume group may also be maintained in nonvolatile storage 214 of primary system 202 separate from those storing the primary volume group.

Figure 3:
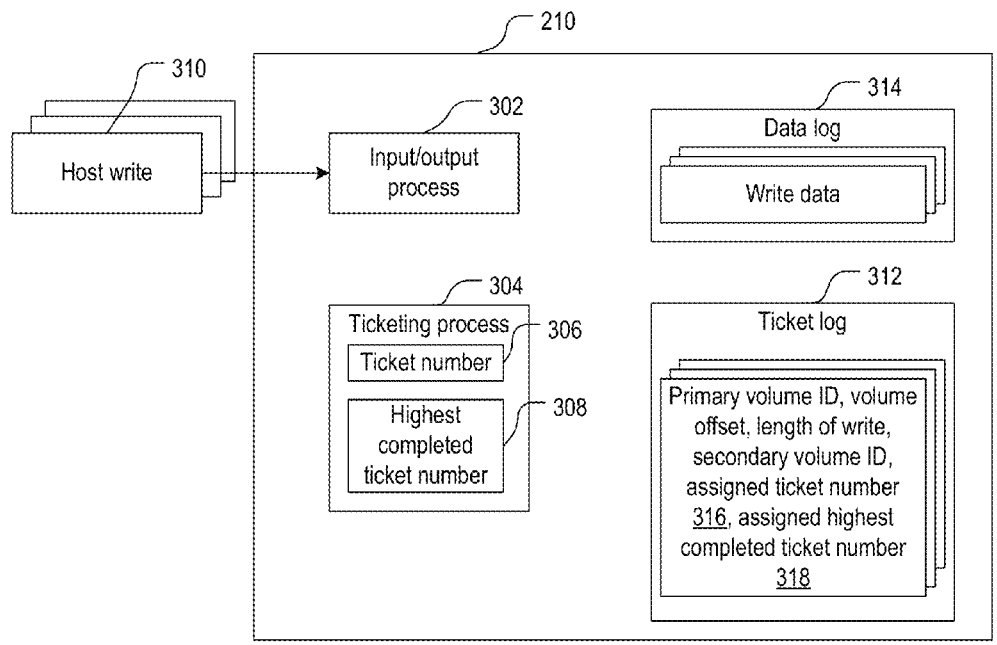
FIG. 3 is a block diagram illustrating asynchronous replication processes and data structures on the primary system of FIG. 2 for utilizing the host write based write ordering mechanism in one or more embodiments of the present disclosure.

FIG. 3 is a block diagram illustrating asynchronous replication processes and data structures on primary system 202 for utilizing the host write based write ordering mechanism in one or more embodiments of the present disclosure. Volatile memory 210 stores an input/output (I/O) process 302 and a ticketing process 304 executed by processor 208. I/O process 302 handles host writes 310 from host computer 106 to one or more primary volume groups at primary system 202. Each host write 310 includes write data and address information, such as a primary volume ID, a volume offset, a length of the write data, and a secondary volume ID.

For each primary volume group at primary system 202, ticketing process 304 tracks a ticket number 306 that is sequentially incremented for each host write 310. For each primary volume group at primary system 202, ticketing process 304 also tracks the highest completed ticket number 308, which is the highest ticket number of completed host writes for each primary volume group at primary system 202. When I/O process 302 receives a host write 310 for a primary volume group, it requests ticketing process 304 to issue a ticket with the current values of the ticket number 306 and the highest completed ticket number 308 for that primary volume group to the host write. Ticket processing 304 saves the address information, the current value of the ticket number (hereafter as "the assigned ticket number 316"), and the current value of the highest completed ticket number (hereafter as "the assigned highest completed ticket number 318") as a ticket in a ticket log 312. I/O process 302 also saves the write data of host write 310 in a data log 314 for that primary volume group.

When I/O process 302 completes a host write 310 for a primary volume group, it informs ticketing process 304 of the completed host write. When the assigned ticket number 316 of the newly completed host write is greater than the highest completed ticket number 308 for that primary volume group, ticketing process 304 sets the highest completed ticket number 308 equal to the assigned ticket number 316 of the newly completed host write.

Figure 4:
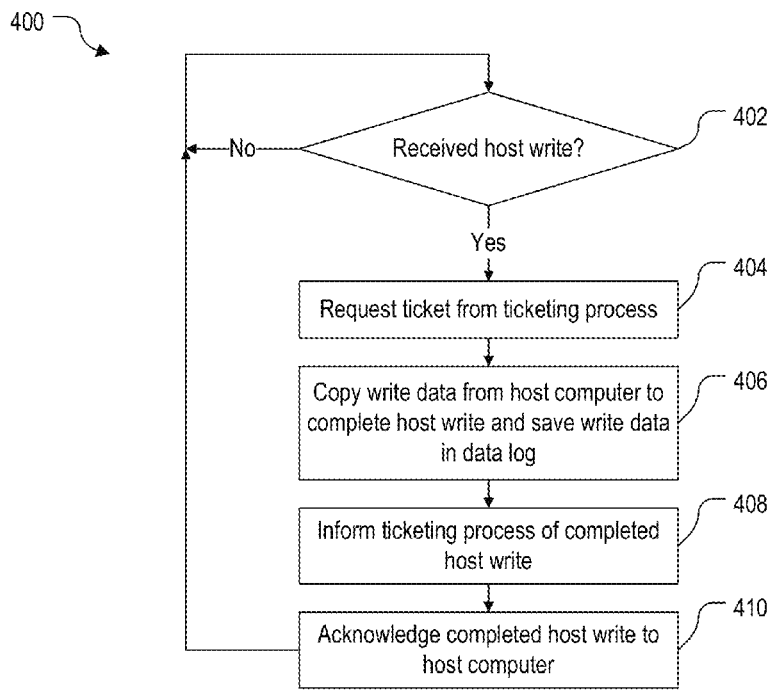
FIG. 4 is a flowchart of a method for an input/output process of FIG. 3 in one or more embodiments of the present disclosure.

FIG. 4 is a flowchart of a method 400 for I/O process 302 of FIG. 3 in one or more embodiments of the present disclosure. Method 400 and others described later may include one or more operations, functions or actions as illustrated by one or more of blocks. The various blocks may be combined into fewer blocks, divided into additional blocks, and/or eliminated based upon the desired implementation. Method 400 may begin in block 402.

In block 402, I/O process 302 executed by processor 208 (FIG. 2) determines if it has received a host write to a primary volume group from host computer 106. If so, block 402 may be followed by block 404. Otherwise block 402 may loop back to itself.

In block 404, I/O process 302 requests ticketing process 304 to issue a ticket for the host write. The ticket includes (1) the current values of the ticket number 306 saved as the assigned ticket number 316 of the host write, and (2) the current value of the highest completed ticket number 308 saved as the assigned highest completed ticket number 318 of the host write. As part of the request, I/O process 302 provides the address information to the ticketing process 304. Block 404 may be followed by block 406.

In block 406, I/O process 302 copies the host write from host computer 106 to complete the host write. Depending on the system requirement, a host write may be considered complete when I/O process 302 caches the host write in volatile memory 210 and duplicate it to the volatile memory in controller node 217 for redundancy. I/O process 302 may eventually flush the host write data to nonvolatile memory 214. I/O process 302 also saves the write data in data log 310. Block 406 may be followed by block 408.

In block 408, I/O process 302 informs ticketing process 304 of the completed host write. The I/O process may identify the completed host write by its assigned ticket number 316. Block 408 may be followed by block 410.

In block 410, I/O process 302 acknowledges the completed host write to host computer 106. Block 410 may loop back to block 402.

Figure 5:
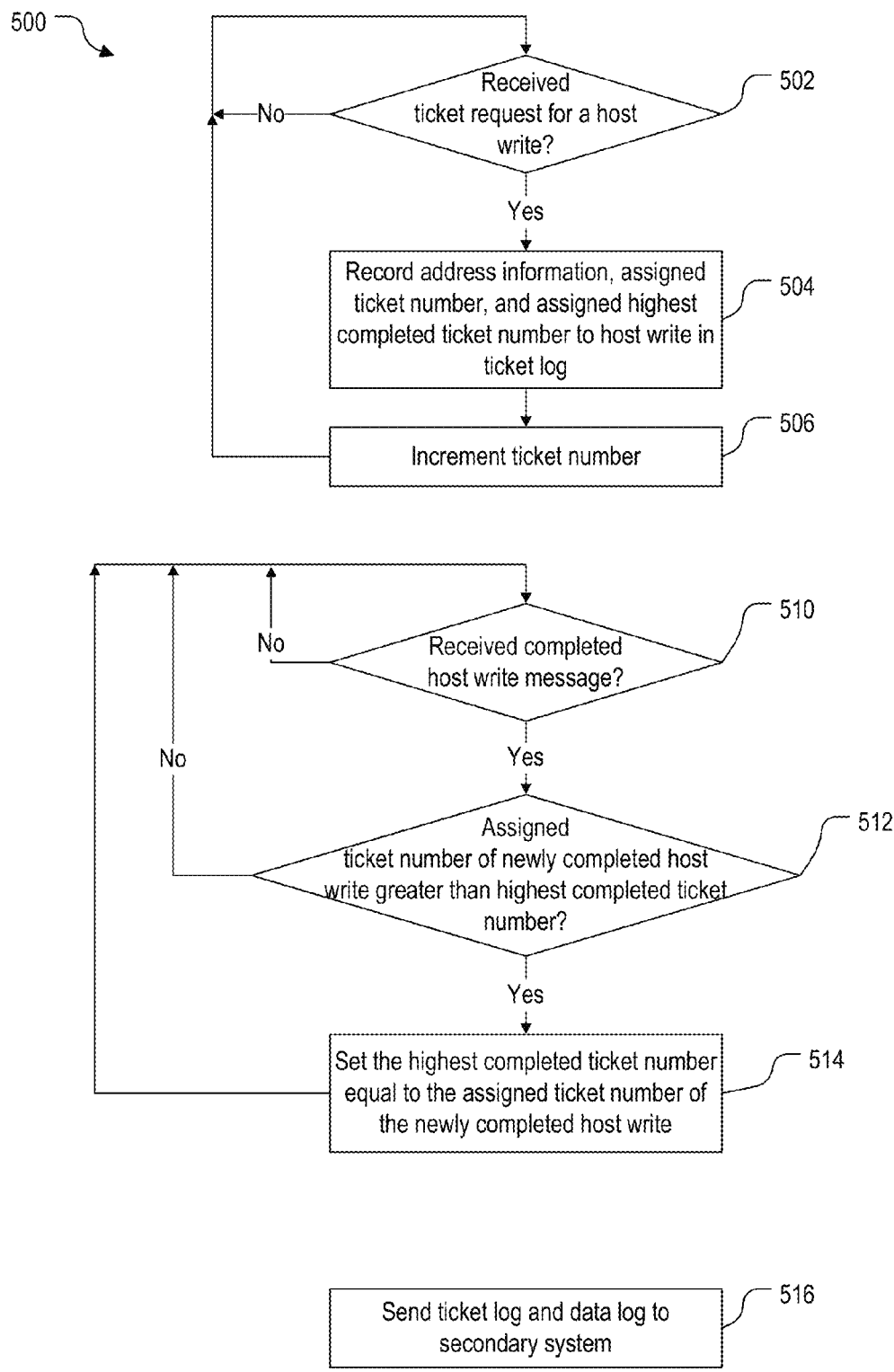
FIG. 5 is a flowchart of a method for a ticketing process of FIG. 3 in one or more embodiments of the present disclosure.

FIG. 5 is a flowchart of a method 500 for ticketing process 304 of FIG. 3 in one or more embodiments of the present disclosure. Method 500 may include sets of blocks performed in parallel.

A first set of blocks may include blocks 502, 504, and 506. In block 502, ticketing process 304 executed by processor 208 determines if it has received a ticket request for a host write to a primary volume group from I/O process 302. If so, block 502 may be followed by block 504. Otherwise block 502 may loop back to itself.

In block 504, ticketing process 304 issues a ticket to the host write. Ticketing process 304 records the address information, the assigned ticket number 316 of the host write, and the assigned completed ticket number 318 of the host write as a ticket in ticket log 312. As described above, the assigned ticket number 316 is the current values of the ticket number 306, and the assigned completed ticket number 318 is the current value of the highest completed ticket number 308. Block 504 may be followed by block 506.

In block 506, ticketing process 304 increments the ticket number 306. Block 504 may loop back to block 502.

A second set of blocks may include blocks 510, 512, and 514. In block 510, ticketing process 304 determines if it has received a completed host write message from I/O process 302. If so, block 510 may be followed by block 512. Otherwise block 510 may loop back to itself.

In block 512, ticketing process 304 determines if the assigned ticket number 316 of the newly completed host write is greater than the highest completed ticket number 308. If so, block 512 may be followed by block 514. Otherwise block 512 may loop back to block 510.

In block 514, ticketing process 304 sets the highest completed ticket number 308 equal to the assigned ticket number 316 of the newly completed host write. Block 514 may loop back to block 510.

A third set of blocks may include block 516. In block 516, ticketing process 304 periodically sends a bulk transfer of ticket log 312 and data log 314 as write requests to secondary system 204.

Figure 6:
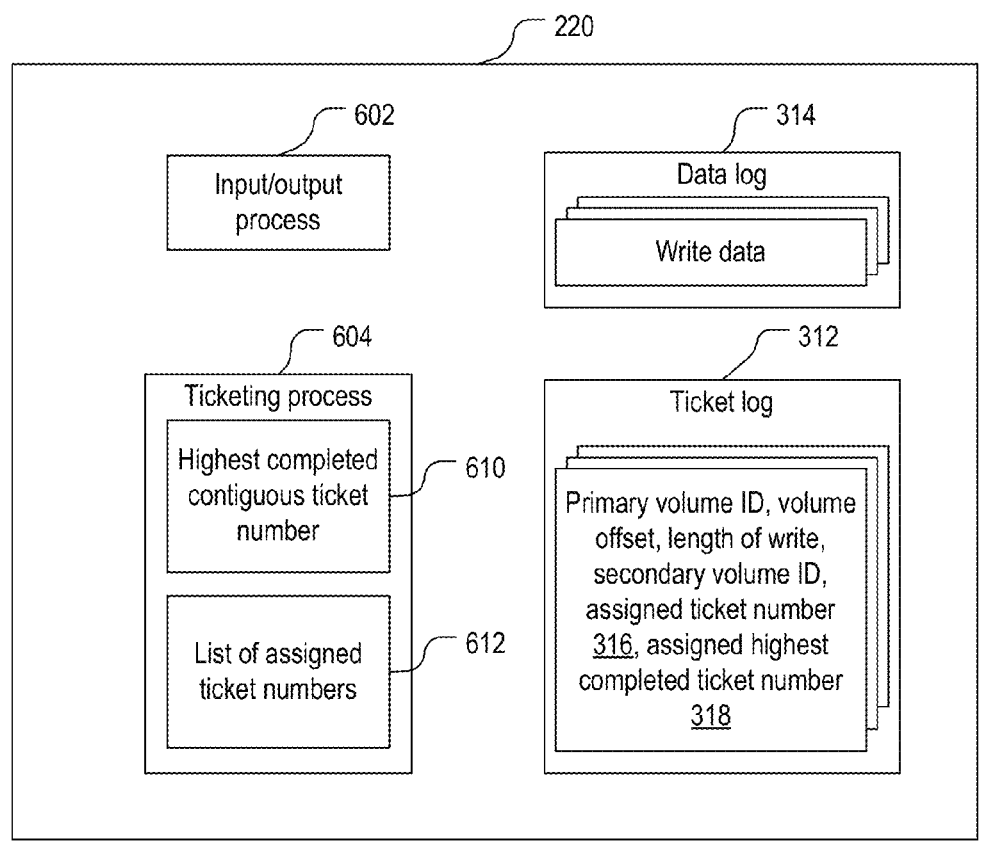
FIG. 6 is a block diagram illustrating asynchronous replication processes and data structures on the secondary system of FIG. 2 for utilizing the host write based write ordering mechanism in one or more embodiments of the present disclosure.

FIG. 6 is a block diagram illustrating asynchronous replication processes and data structures on the secondary system of FIG. 2 for utilizing the host write based write ordering mechanism in one or more embodiments of the present disclosure. Volatile memory 220 stores an I/O process 602 and a ticketing process 604 executed by processor 218 (FIG. 2). With permission from ticketing process 604, I/O process 602 completes write requests from primary system 202 embodied in ticket log 312 and data log 314 for one or more secondary volume groups at secondary system 204.

I/O process 602 requests ticketing process 604 for permission to complete write requests. For each secondary volume group, ticketing process 604 tracks the highest completed contiguous ticket number 610 at secondary system 204, which is the highest ticket number from completed writes at each secondary volume group at second system 204 that is contiguous from the first completed write request to that secondary volume group. Ticketing process 604 gives permission for write requests that have assigned highest completed ticket numbers 318 equal to or less than the highest completed contiguous ticket number 610.

When I/O process 602 completes a write request, it informs ticketing process 604 of the newly completed write. Ticketing process 604 sets the highest completed contiguous ticket number 610 equal to the assigned ticket number 316 of the newly completed write when the assigned ticket number 316 of the newly completed write is contiguous with the highest completed contiguous ticket number 610. Otherwise ticketing process 604 saves the assigned ticket number 316 of the newly completed write in a list 612 that it checks for contiguity with the highest completed contiguous ticket number 610.

Figure 7:
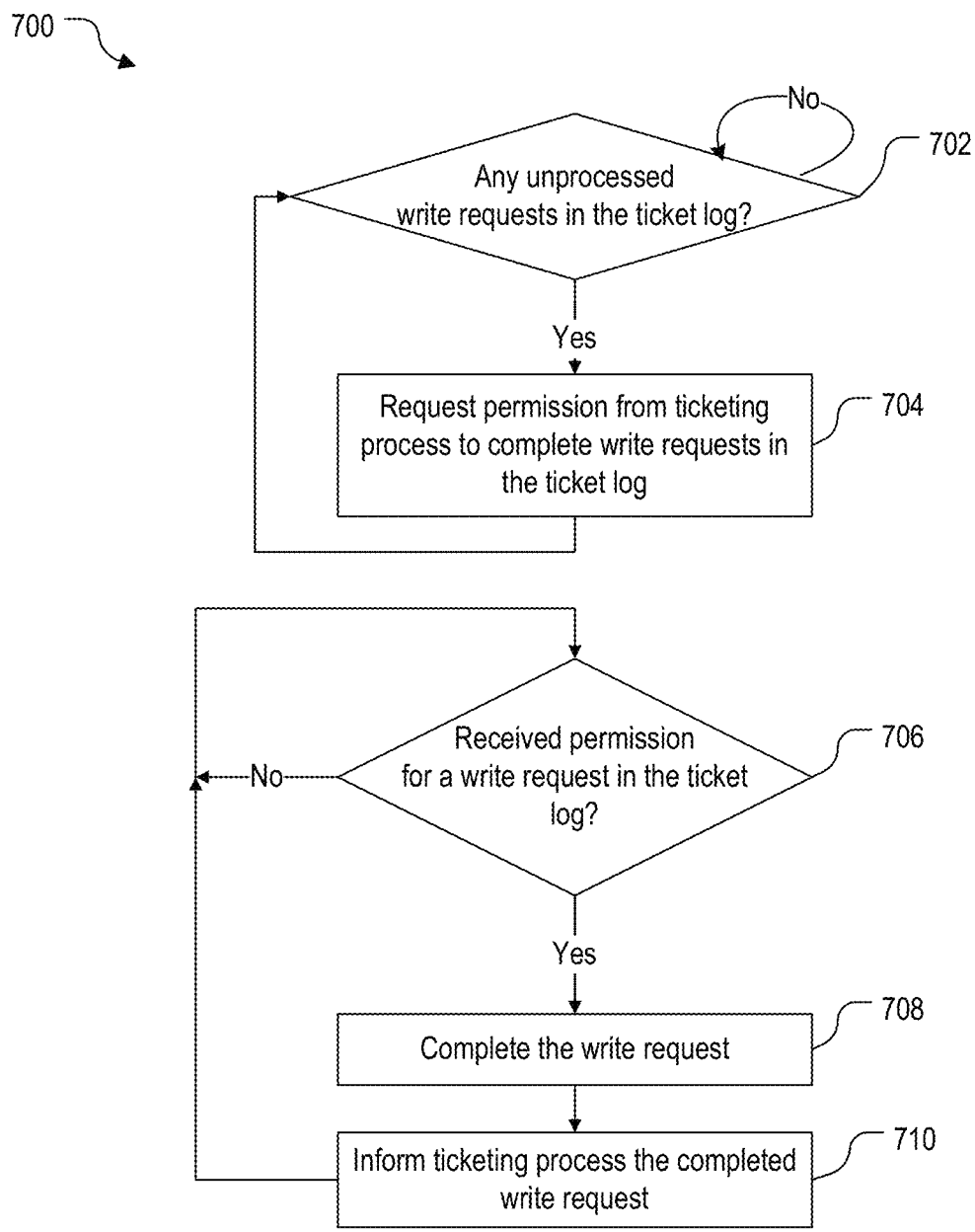
FIG. 7 is a flowchart of a method for an input/output process of FIG. 6 in one or more embodiments of the present disclosure.

FIG. 7 is a flowchart of a method 700 for I/O process 602 of FIG. 6 in one or more embodiments of the present disclosure. Method 700 may include sets of blocks performed in parallel.

A first set of blocks may include blocks 702 and 704. In block 702, I/O processor 602 executed by processor 218 determines if there is any unprocessed write requests in the ticket log 312. If so, block 702 may be followed by block 704. Otherwise block 702 may loop back to itself.

In block 704, I/O processor 602 requests permission to complete the write requests in ticket log 312. As part of the request, I/O process 302 provides the tickets of the write requests to ticketing process 604. Block 704 may loop back to block 702.

A second set of blocks include blocks 706, 708, and 710. In block 706, I/O processor 602 determines if it has received permission from ticketing process 604 to complete a write request in ticket log 312. If so, block 706 may be followed by block 708. Otherwise block 706 may loop back to itself.

In block 708, I/O process 602 proceeds to complete the write request. Note that permission may be received for one write request while the previously permitted write request is ongoing. This improves performance as more write requests can proceed on secondary system 204 at the same time. Depending on the system requirement, a write may be considered complete when I/O process 602 caches the write in volatile memory 220 and duplicate it to the volatile memory in controller node 227 for redundancy. I/O process 602 may eventually flush the write data to nonvolatile memory 224. Block 708 may be followed by block 710.

In block 710, I/O process 602 informs ticketing process 604 of the completed write request. Block 710 may loop back to block 706.

Figure 8A:
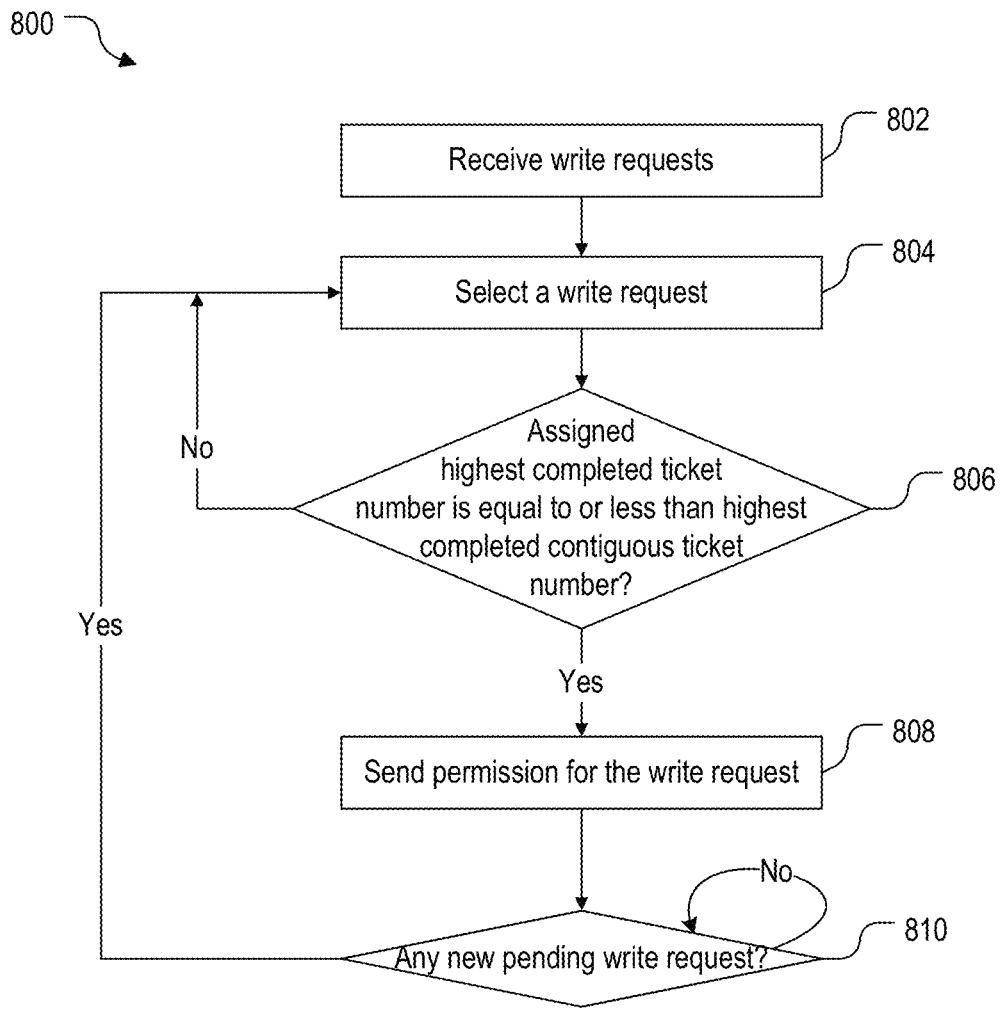
FIGS. 8A and 8B are a flowchart of a method for a ticketing process of FIG. 6 in one or more embodiments of the present disclosure.
Figure 8B:
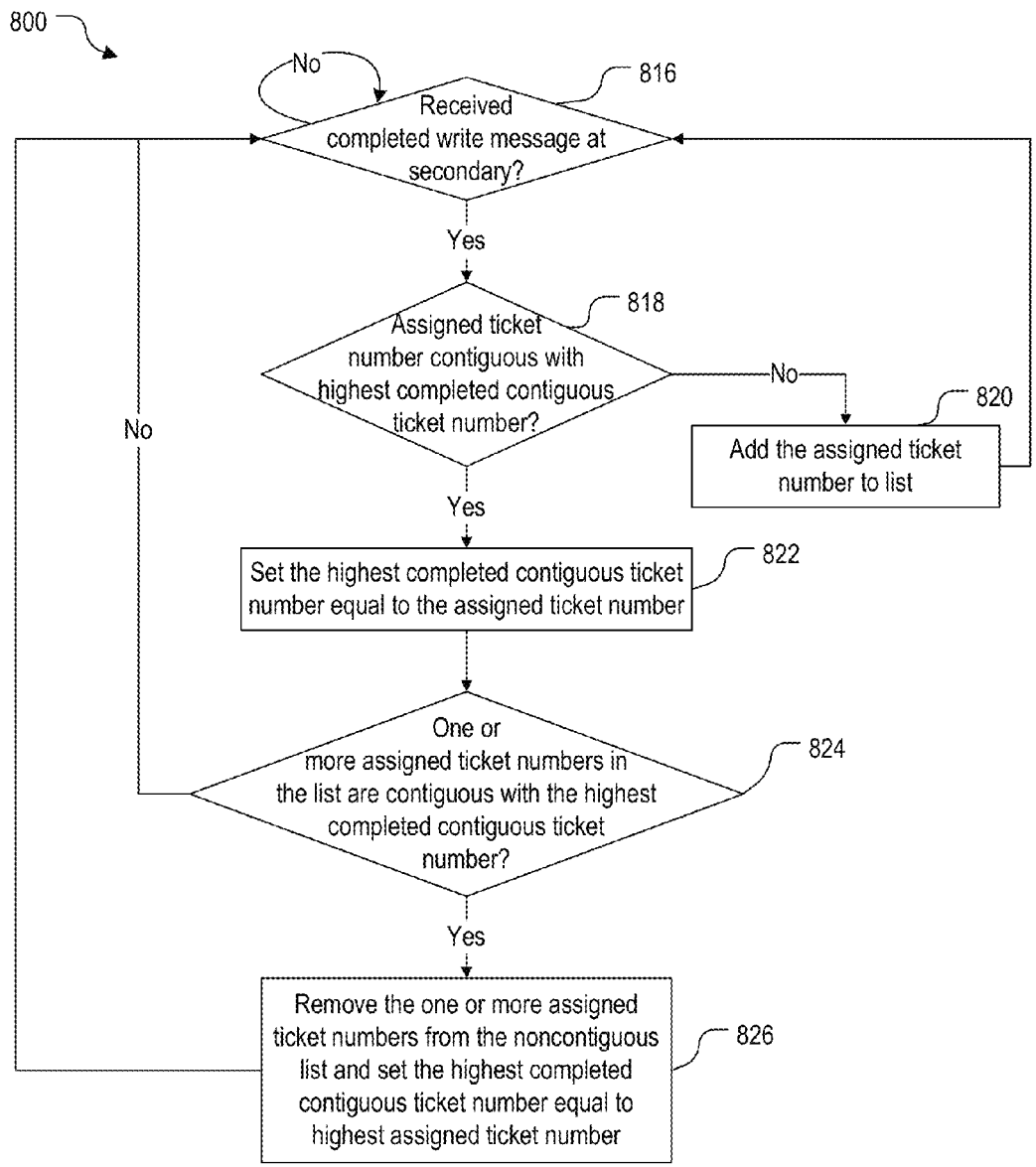

FIGS. 8A and 8B are a flowchart of a method 800 for a ticketing process 604 of FIG. 6 in one or more embodiments of the present disclosure. Method 800 may include sets of blocks performed in parallel.

Referring to FIG. 8A, a first set of blocks may include blocks 802, 804, 806, 808, and 810. In block 802, ticketing process 604 executed by processor 218 receives write requests from I/O process 602. As described above, the write requests include their tickets. Block 802 may be followed by block 806.

In block 804, ticketing process 604 selects a write request. Block 804 may be followed by block 806.

In block 806, ticketing process 604 determines if the assigned highest completed ticket number 318 of the write request is equal to or less than the highest completed contiguous ticket number 610. If so, block 806 may be followed by block 808. Otherwise block 806 may loop back to block 804.

In block 808, ticketing process 604 sends permission to I/O process 602 for the write request. Note that permission may be given for one write request while the previously permitted write request is ongoing. This improves performance as more write requests can proceed on secondary system 204 at the same time. Block 808 may be followed by block 810.

In block 810, ticketing process 604 determines if it has received any new pending write request. If so, block 810 may loop back to block 804. Otherwise block 810 may loop back to itself.

Referring to FIG. 8B, a second set of blocks may include blocks 816, 818, 820, 822, and 824, and 826. In block 816, ticketing process 604 determines if it has received a completed write message from I/O process 602. If so, block 816 may be followed by block 818. Otherwise block 816 may loop back to itself.

In block 818, ticketing process 604 determines if the assigned ticket number 316 of the newly completed write is contiguous with the highest completed contiguous ticket number 610. If not, block 818 may be followed by block 820. If so, block 818 may be followed by block 822. The highest completed contiguous ticket number 610 may be initialized at zero to indicate the start of the sequence at the beginning of method 800.

In block 820, ticketing process 604 adds the assigned ticket number 316 of the newly completed write to a list 612 of ticket numbers that were initially found to be not contiguous with the highest completed contiguous ticket number 610. Block 820 may loop back to block 816.

In block 822, ticketing process 604 sets the highest completed contiguous ticket number 610 equal to the assigned ticket number 316 of the newly completed write. This allows those write requests having the assigned highest completed ticket numbers 318 equal or less than the highest completed contiguous ticket number 610 to proceed as described in FIG. 8A. Block 822 may be followed by block 824.

In block 824, ticketing process 604 determines if one or more assigned ticket numbers 316 in list 612 is contiguous with the highest completed contiguous ticket number 610. If not, block 824 may loop back to block 816. If so, block 824 may be followed by block 826.

In block 826, ticketing process 604 removes the one or more assigned ticket numbers 316 from list 612 and sets the highest completed contiguous ticket number 610 equal to the highest ticket number from the one or more assigned ticket number 316. Block 826 may loop back to block 816.

Various other adaptations and combinations of features of the embodiments disclosed are within the scope of the present disclosure. Numerous embodiments are encompassed by the following claims.

What is claimed is:

1. A method for asynchronously replicating data from a primary system to a secondary system, the method comprising:
   the primary system receiving a sequence of host writes from a host system, the host writes including address information and write data;
   the primary system recording sequential positions of the host writes;
   the primary system recording sequential dependencies of the host writes based on the sequential positions, the sequential dependencies indicating which of the host writes are overlapping writes, wherein the overlapping writes are host writes that were issued in different times by the host system but overlap in time;
   the primary system completing the host writes and then acknowledging the completed host writes to the host system;
   the primary system sending the host writes, the sequential positions, and the sequential dependencies as write requests to the secondary system; and
   the secondary system writing the overlapping writes at the same time at the secondary system.

2. The method of claim 1, wherein the host writes are destined for a primary volume group including one or more volumes, and the host writes are replicated to a secondary volume group including one or more corresponding volumes at the secondary system.

3. The method of claim 2, wherein the primary system and the secondary system are implemented on two distinct and physically separated systems.

4. The method of claim 2, wherein the primary system and the secondary system are implemented on one system, and the primary volume group are distinct from the secondary volume group.

5. The method of claim 2, wherein each address information includes a volume ID identifying a volume in the primary volume group, a volume offset, and a write data length.

6. A method for asynchronously replicating data from a primary system to a secondary system, the method comprising:
   the primary system receiving a sequence of host writes from a host system, the host writes including address information and write data;
   the primary system recording sequential positions of the host writes;
   the primary system recording sequential dependencies of the host writes based on the sequential positions;
   the primary system completing the host writes and then acknowledging the completed host writes to the host system;
   the primary system sending the host writes, the sequential positions, and the sequential dependencies as write requests to the secondary system; and
   wherein:
      recording the sequential positions and recording the sequential dependencies comprise:
         for each host write, the primary system:
            issuing a ticket to the host write, the ticket comprising an assigned ticket number and an assigned highest completed ticket number, the assigned ticket number comprising a current value of a ticket number at the primary system, the assigned highest completed ticket number comprising a current value of a highest completed ticket number at the primary system;
            incrementing the ticket number after issuing the ticket; and
            storing the address information and the ticket in a ticket log;
         the primary system storing the write data in a data log;
         for each completed host write in the primary system, the primary system setting the highest completed ticket number equal to the assigned ticket number of the completed host write when the assigned ticket number of the completed host write is greater than the highest completed ticket number; and
      sending the host writes, the sequential positions, and the sequential dependencies comprises the primary system sending the ticket log and the data log as write requests to the secondary system.

7. The method of claim 6, wherein completing the write requests comprises:
   for each write request, the secondary system completing the write request when an assigned highest completed ticket number of the write request is equal to or less than a highest completed contiguous ticket number at the secondary system, the highest completed contiguous ticket number being a highest assigned ticket number from assigned ticket numbers of completed write requests that are contiguous from a start of the sequence.

8. The method of claim 7, wherein completing the write requests further comprises:

for each completed write request in the secondary system:
    saving an assigned ticket number of the completed write request in a list when the assigned ticket number is not contiguous with the highest completed contiguous ticket number; and
    when the assigned ticket number is contiguous with the highest completed contiguous ticket number, the secondary system:
        setting the highest completed contiguous ticket number equal to the assigned ticket number; and
        when one or more assigned ticket numbers in the list are contiguous with the highest completed contiguous ticket number:
            removing the one or more assigned ticket numbers from the list; and
            setting the highest completed contiguous ticket number equal to a highest assigned ticket number from the one or more assigned ticket numbers.

9. The method of claim 7, wherein the secondary system complete in parallel write requests having assigned completed ticket numbers equal to or less than the highest completed contiguous ticket number.

10. A system, comprising:
    a primary system, comprising:
        a memory storing an input/output process and a ticketing process;
        a processor executing:
            the input/output process to:
                receive a sequence of host writes from a host system;
                for each host write, request a ticket from the ticketing process;
                completing the host writes and storing write data of the host writes in a data log;
                for each completed host write:
                    inform the ticketing process of the completed host write;
                    acknowledge the completed host write to the host system;
            the ticketing processor to:
                for each host write:
                    issue a ticket, the ticket comprising an assigned ticket number and an assigned highest completed ticket number, the assigned ticket number comprising a current value of a ticket number at the primary system, the assigned highest completed ticket number comprising a current value of a highest completed ticket number at the primary system;
                    increment the ticket number after issuing the ticket; and
                    store the address information and the ticket in a ticket log;
                for each completed host write:
                    set the highest completed ticket number equal to the assigned ticket number of the completed host write when the assigned ticket number of the completed host write is greater than the highest completed ticket number; and
                    send the ticket log and the data log as write requests to a secondary system.

11. The system of claim 10, further comprising:
    the secondary system, comprising:
        another memory storing an other input/output process and an other ticketing process;
        an other processor executing:
            the other input/output process to:
                for each write request:
                    request permission from the other ticking processor to complete the write request;
                    completing the write request after receiving permission;
                for each completed write request, inform the ticketing process of the completed write request;
            the other ticketing processor to:
                for each write request, providing permission for the write request when an assigned highest completed ticket number of the write request is equal to or less than a highest completed contiguous ticket number at the secondary system, the highest completed contiguous ticket number being a highest assigned ticket number from assigned ticket numbers of completed write requests that are contiguous from a start of the sequence.

12. The system of claim 11, wherein the other processor further executes the other ticketing process to:
    for each completed write request in the secondary system:
        save an assigned ticket number of the completed write request in a list when the assigned ticket number is not contiguous with the highest completed contiguous ticket number; and
    when the assigned ticket number is contiguous with the highest completed contiguous ticket number:
        set the highest completed contiguous ticket number equal to the assigned ticket number; and
        when one or more assigned ticket numbers in the list are contiguous with the highest completed contiguous ticket number:
            remove the one or more assigned ticket numbers from the list; and
            set the highest completed contiguous ticket number equal to a highest assigned ticket number from the one or more assigned ticket numbers.

13. The system of claim 11, wherein the other processor executes the other input/output process to complete in parallel write requests having assigned completed ticket numbers equal to or less than the highest completed contiguous ticket number.

14. The system of claim 10, wherein the host writes are destined for a primary volume group including one or more volumes, and the host writes are replicated to a secondary volume group including one or more corresponding volumes at the secondary system.

15. The system of claim 14, wherein the primary system and the secondary system are implemented on two distinct and physically separated systems.

16. The system of claim 14, wherein the primary system and the secondary system are implemented on one system, and the primary volume group are distinct from the secondary volume group.

17. The system of claim 14, wherein each address information includes a volume ID identifying a volume in the primary volume group, a volume offset, and a write data length.

* * * * *

UNITED STATES PATENT AND TRADEMARK OFFICE
CERTIFICATE OF CORRECTION

| | | |
|---|---|---|
| PATENT NO. | : 8,667,236 B2 | Page 1 of 1 |
| APPLICATION NO. | : 12/893335 | |
| DATED | : March 4, 2014 | |
| INVENTOR(S) | : Phelps et al. | |

It is certified that error appears in the above-identified patent and that said Letters Patent is hereby corrected as shown below:

In the Claims

Column 12, line 8, in Claim 11, delete "ticking" and insert -- ticketing --, therefor.

Signed and Sealed this
Seventeenth Day of June, 2014

Michelle K. Lee
*Deputy Director of the United States Patent and Trademark Office*